(12) United States Patent
Roumeliotis

(10) Patent No.: US 7,991,576 B2
(45) Date of Patent: Aug. 2, 2011

(54) INDOOR NAVIGATION SYSTEM AND METHOD

(75) Inventor: Stergios I. Roumeliotis, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 207 days.

(21) Appl. No.: 12/381,855

(22) Filed: Mar. 17, 2009

(65) Prior Publication Data

US 2009/0177437 A1 Jul. 9, 2009

Related U.S. Application Data

(63) Continuation of application No. PCT/US2007/020320, filed on Sep. 19, 2007.

(60) Provisional application No. 60/845,925, filed on Sep. 20, 2006.

(51) Int. Cl.
 *G01C 23/00* (2006.01)
 *G01C 21/00* (2006.01)
 *G01C 22/00* (2006.01)
 *G06F 19/00* (2011.01)

(52) U.S. Cl. ........ 702/159; 340/995.1; 340/995.28; 701/206; 701/207; 701/217; 701/300; 702/155; 702/158; 702/160

(58) Field of Classification Search ............ 340/988, 340/995.1, 995.19, 995.24, 995.28; 701/200, 701/206, 207, 208, 217, 300; 702/1, 127, 702/150, 151, 152, 153, 154, 155, 158, 159, 702/160, 189, 187
See application file for complete search history.

(56) References Cited

U.S. PATENT DOCUMENTS

| | | | | | |
|---|---|---|---|---|---|
| 3,430,243 | A | * | 2/1969 | Evans | 342/465 |
| 3,878,612 | A | * | 4/1975 | Reed | 33/1 SD |
| 4,879,658 | A | * | 11/1989 | Takashima et al. | 701/209 |
| 4,893,246 | A | * | 1/1990 | Iihoshi et al. | 701/208 |
| 4,963,864 | A | * | 10/1990 | Iihoshi et al. | 340/995.22 |
| 4,963,865 | A | * | 10/1990 | Ichikawa et al. | 340/995.14 |
| 5,016,007 | A | * | 5/1991 | Iihoshi et al. | 340/995.22 |
| 5,170,165 | A | * | 12/1992 | Iihoshi et al. | 340/995.22 |
| 5,459,667 | A | * | 10/1995 | Odagaki et al. | 701/209 |
| 5,904,726 | A | * | 5/1999 | Vock et al. | 701/208 |
| 5,926,118 | A | * | 7/1999 | Hayashida et al. | 340/995.21 |
| 5,944,768 | A | * | 8/1999 | Ito et al. | 701/200 |
| 5,956,660 | A | | 9/1999 | Neumann | |
| 6,081,230 | A | * | 6/2000 | Hoshino et al. | 342/357.32 |
| 6,226,591 | B1 | * | 5/2001 | Okumura et al. | 701/216 |

(Continued)

FOREIGN PATENT DOCUMENTS

JP 2002-262331 9/2002

(Continued)

OTHER PUBLICATIONS

"International Application Serial No. PCT/US2007/020320, International Search Report mailed Mar. 12, 2008", 4 pgs.

(Continued)

*Primary Examiner* — Edward R Cosimano

(74) *Attorney, Agent, or Firm* — Schwegman, Lundberg & Woessner, P.A.

(57) ABSTRACT

This document discusses, among other things, a portable device that generates position and orientation data to facilitate movement within a building. The device can be, for example, handheld or affixed to a cane. Data for navigation is derived from reflections from interior surfaces and dead reckoning sensors.

28 Claims, 9 Drawing Sheets

U.S. PATENT DOCUMENTS

| | | | |
|---|---|---|---|
| 6,522,266 B1* | 2/2003 | Soehren et al. | 340/988 |
| 6,853,909 B2* | 2/2005 | Scherzinger | 701/207 |
| 7,043,364 B2* | 5/2006 | Scherzinger | 701/213 |
| 7,184,885 B2* | 2/2007 | Watanabe | 701/201 |
| 7,363,147 B2* | 4/2008 | Esaki et al. | 701/200 |
| 7,747,409 B2* | 6/2010 | Ladetto et al. | 702/150 |
| 2003/0114984 A1* | 6/2003 | Scherzinger | 701/216 |
| 2004/0267443 A1* | 12/2004 | Watanabe | 701/201 |
| 2005/0203701 A1* | 9/2005 | Scherzinger | 701/207 |
| 2006/0247854 A1* | 11/2006 | Esaki et al. | 701/210 |
| 2007/0155404 A1* | 7/2007 | Yamane et al. | 455/456.1 |
| 2007/0260418 A1* | 11/2007 | Ladetto et al. | 702/150 |
| 2009/0248304 A1* | 10/2009 | Roumeliotis et al. | 701/220 |

FOREIGN PATENT DOCUMENTS

| | | |
|---|---|---|
| KR | 1020010113370 | 12/2001 |
| KR | 1020020001257 | 1/2002 |
| WO | WO-2008/036325 A2 | 3/2008 |
| WO | WO 2008/036325 A2 * | 3/2008 |

OTHER PUBLICATIONS

"International Application Serial No. PCT/US2007/020320, Written Opinion mailed Mar. 12, 2008", 3 pgs.

Balachandran, W., et al., "A GPS Based Navigation Aid for the Blind", *17th International Conference on Applied Electromagnetics and Communications (ICECom 2003)*, (Oct. 1-3, 2003, Dubrovnik, Croatia), (2003), 34-36.

Ceranka, S., et al., "Application of Particle Filtering in Navigation System for Blind", *Proceedings, Seventh International Symposium on Signal Processing and its Applications*, vol. 2., (2003), 495-498.

Ertan, S., et al., "A Wearable Haptic Navigation Guidance System", *Second International Symposium on Wearable Computers. Digest of Papers*, (1998), 164-165.

Hesch, J. A., et al., "An Indoor Localization Aid for the Visually Impaired", *2007 IEEE International Conference on Robotics and Automation (ICRA 2007)*, (Rome, Italy), (2007), 3545-3551.

Jirawimut, R., et al., "Visual Odometer for Pedestrian Navigation", *IEEE Transactions on Instrumentation and Measurement*, 52(4), (2003), 1166-1173.

Kulyukin, V., et al., "A Robotic Guide for the Visually Impaired in Indoor Environments", *In: Conference of the Rehabilitation Engineering and Assistive Technology of North America (RESNA, 2004)*, (2004), 4 pgs.

Kulyukin, V., et al., "A Robotic Wayfinding System for the Visually Impaired", *In: Proceedings of the Sixteenth Innovative Applications of Artificial Intelligence Conference (IAAI-04)*, (2004), 6 pgs.

Kulyukin, V., et al., "RFID in Robot-Assisted Indoor Navigation for the Visually Impaired", *Proceedings of 2004 IEEE/RSJ International Conference on Intelligent Robots and Systems*, (Sep. 28-Oct. 2, 2004, Sendai, Japan), (2004), 1979-1982.

Makino, H., et al., "Development of Navigation System for the Blind Using GPS and Mobile Phone Combination", *18th Annual Conference of the IEEE Engineering in Medicine and Biology Society*, (Amsterdam), (1996), 506-507.

Ran, L., et al., "Drishti: An Integrated Indoor/Outdoor Blind Navigation System and Service", *Proceedings of the Second IEEE Annual Conference on Pervasive Computing and Communications (PERCOM '04)*, (2004), 8 pgs.

Ross, D. A., et al., "Evaluation of Orientation Interfaces for Wearable Computers", *The Fourth International Symposium on Wearable Computers*, (2000), 51-58.

Shim, I., et al., "A Robotic Cane Based on Interactive Technology", *IEEE 2002 28th Annual Conference of the Industrial Electronics Society (IECON '02)*, vol. 3, (2002), 2249-2254.

Virkes, D., et al., "Positioning Systems for Mobility of the Blind, Overview and Analysis", *46th International Symposium Electronics in Marine (ELMAR-2004)*, Jun. 16-18, 2004, Zadar, Croatia), (2004), 342-346.

Whitney, G. J., "New Technology Assistive Devices to Assist Blind and Partially Sighted People to Travel Within and Use the Built Environment", *Road Transport Information and Control, Conference Publication No. 454*, (1998), 55-58.

Wong, F., et al., "Application of Stereovision in a Navigation Aid for Blind People", *Proceedings of the 2003 Joint Conference of the Fourth International Conference on Information, Communications and Signal Processing (JCICS-PCM 2003)*, vol. 2, (2003), 734-737.

\* cited by examiner

US 7,991,576 B2

INDOOR NAVIGATION SYSTEM AND METHOD

CROSS-REFERENCE TO RELATED APPLICATIONS

This application is a continuation under 35 U.S.C. 111(a) of International Application No. PCT/US2007/020320, filed Sep. 19, 2007 and published as WO 2008/036325 on Mar. 27, 2008, which application claims priority to expired U.S. provisional application Ser. No. 60/845,925, filed Sep. 20, 2006, which is incorporated herein by reference in its entirety.

TECHNICAL FIELD

This document pertains generally to navigation, and more particularly, but not by way of limitation, to indoor navigation.

BACKGROUND

Human mobility entails execution of several tasks including path planning, navigation, and obstacle avoidance. Visually impaired people cannot accurately assess the surrounding environment. Seeing-eye dogs and white canes are widely used for the purpose of guidance and environment sensing. The former, however, has costly and often prohibitive training requirements, while the latter can only provide cues about ones immediate surroundings.

Traditional systems for navigating within a building are generally costly or ineffective. For example, the installation and operating costs associated with an installed base of radio frequency markers within a building are substantial barriers not readily overcome. In addition, poor reception of radio frequency navigation signals within a building, such as that used by satellite-based navigation systems (for example, global positioning systems), precludes widespread acceptance.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
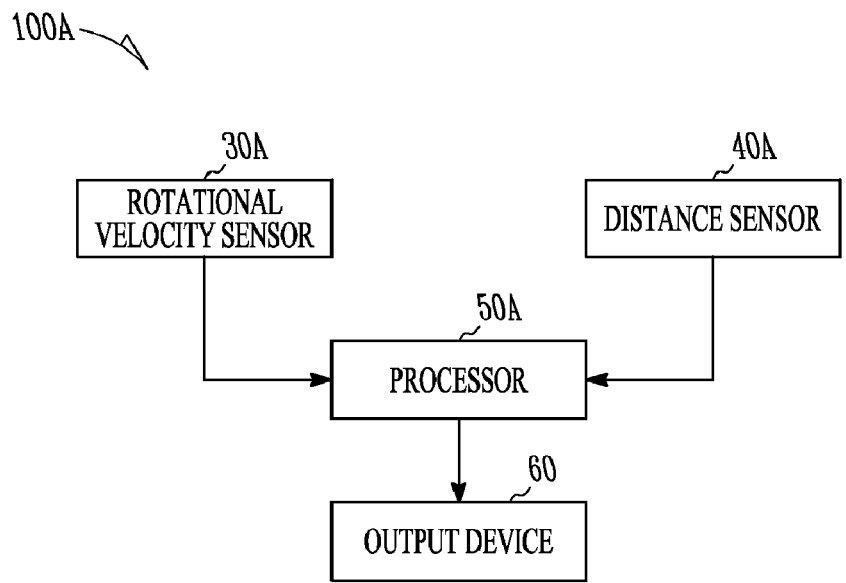
FIGS. 1 and 2 include block diagrams of an indoor navigation system.

The following detailed description includes references to the accompanying drawings, which form a part of the detailed description. The drawings show, by way of illustration, specific embodiments in which the present subject matter may be practiced. These embodiments, which are also referred to herein as "examples," are described in enough detail to enable those skilled in the art to practice the present subject matter. The embodiments may be combined, other embodiments may be utilized, or structural, logical and electrical changes may be made without departing from the scope of the present subject matter. The following detailed description is, therefore, not to be taken in a limiting sense, and the scope of the present subject matter is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present subject matter provides information derived from environmental sensing (e.g., position, orientation, or local geometry) based on the use of appropriate sensors and sensor fusion algorithms.

One example of the present subject matter includes a portable system for indoor human localization having a pedometer and a white cane, on which a laser range finder, and a 3-axis gyroscope are disposed. An algorithm executed by a processor estimates the heading and position of a person navigating in an indoor space. The algorithm includes a two-layered, Extended Kalman Filter (EKF) for attitude and position estimation wherein a first layer maintains an attitude estimate of the white cane and a second layer estimates a position of the user.

One example of the present subject matter includes a sensor package configured for mounting on a white cane. An exemplary embodiment of this configuration is unobtrusive to the user, is operable without calibration to a particular body type, and preserves the ability of the user to physically touch the environment with the white cane.

In one example, a pair of sensors (a laser scanner and a 3-axis gyroscope) are mounted beneath the white cane and provide attitude information about the cane, and a light-weight, foot-mounted pedometer measures the user's walking speed. Information from these three sources can be fused in a single pose estimator. All the sensors, however, can move in three dimensions (3-D) and the coordinate transformation from the pedometer to the laser/gyro is unknown and time varying.

The present subject matter includes a two-stage (2.5-D) estimator. In the first stage, rotational velocity measurements from the 3-axis gyroscope are combined with relative attitude measurements inferred from the laser scan data to estimate the 3-D attitude of the cane. The second stage incorporates corner features extracted from the laser data, linear velocity measurements from the pedometer, and a filtered version of the cane's yaw to compute 2-D pose estimates of the user. The laser data is utilized in both filters and statistical correlations in the estimates are avoided by using the even-indexed data points in the attitude filter, and the odd-indexed data points in the position filter. By exploiting a priori information about the location of environmental features (corners), and considering that the primary structural planes (floor, ceiling, walls) of a building lie perpendicular to each other, an example of the method generates a reliable localization estimate of a human traveling indoors.

FIG. 1 illustrates block diagram of system 100A configured for indoor navigation. Data received from rotational velocity sensor 30A and distance sensor 40A is processed by processor 50A to generate navigation data that is rendered using output device 60. Rotational velocity sensor 30A can include a gyroscope, an inertial measurement unit, an accelerometer, an inclinometer, a magnetometer or other device that generates data corresponding to rotational velocity. Distance sensor 40A can include a range finding sensor such as a laser-based or ultrasonic-based sensor or other distance measuring equipment. In various examples, distance sensor 40A includes an acoustical sensor or an optical flow sensor or other camera-based sensor.

Processor 50A, in various examples, includes a handheld computer, such as a personal digital assistant (PDA), a laptop computer or other processor.

Output device 60 can include a headphone, a speaker or other audio transducer. In addition, output device 60 can include a haptic transducer that provides a human-perceivable signal corresponding to navigation data derived from processor 50A.

Figure 2:
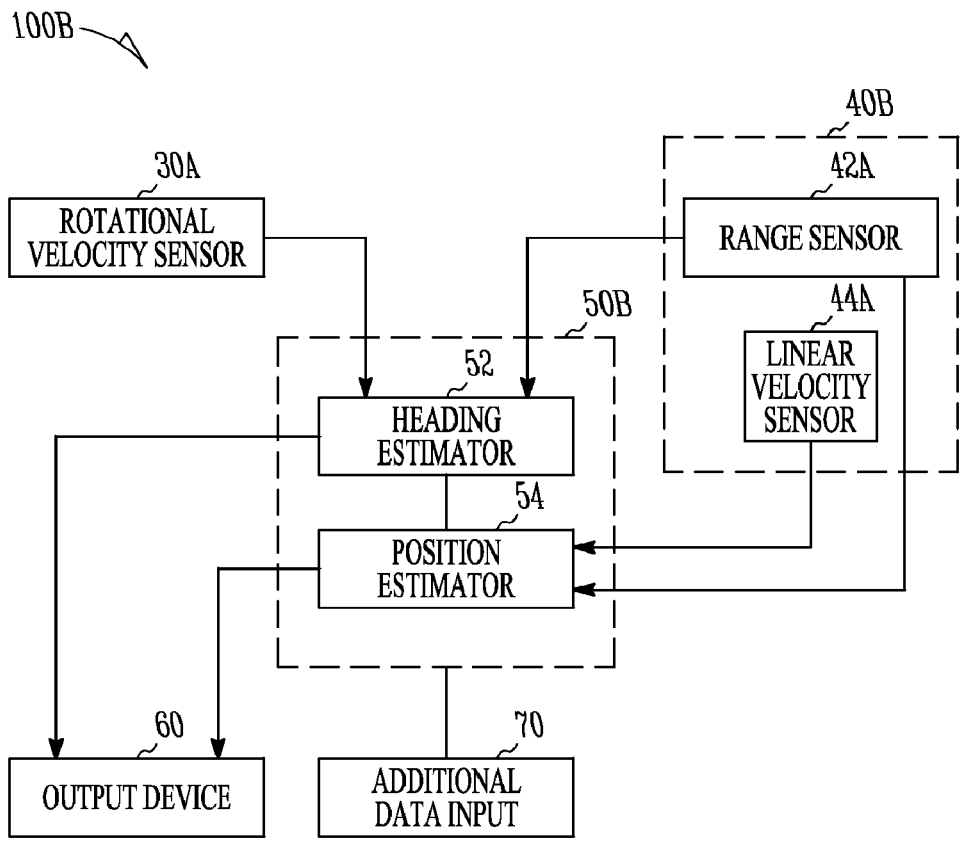

FIG. 2 illustrates a block diagram of system 100B having rotational velocity sensor 30A and distance sensor 40B coupled to processor 50B. In the figure, distance sensor 40B includes range sensor 42A and linear velocity sensor 44A. Range sensor 42A, in one example, includes a laser-based rangefinder. Linear velocity sensor 44A includes a pedometer, an accelerometer or an optical flow sensor.

Processor 50B executes a filter algorithm as described elsewhere in this document and in various examples, includes an extended Kalman filter. In the figure, processor 50B includes heading estimator 52 and position estimator 54. Heading estimator 52 includes a filter that generates an estimate of heading based on data from rotational velocity sensor 30A and data from range sensor 42A. Range sensor 42A provides data based on selected point locations and line segments.

Data corresponding to the heading estimate is provided to position estimator 54. Position estimator 54 receives inputs from linear velocity sensor 44A and, in the example shown, data from range sensor 42A. Data provided by range sensor 42A can include features and landmarks.

In addition, processor 50B is shown coupled to additional data input 70. In one example, additional data input 70 includes a digital file corresponding to a stored map. The stored map data can be received wirelessly by a transceiver or from a user-accessible storage device.

Figure 3:
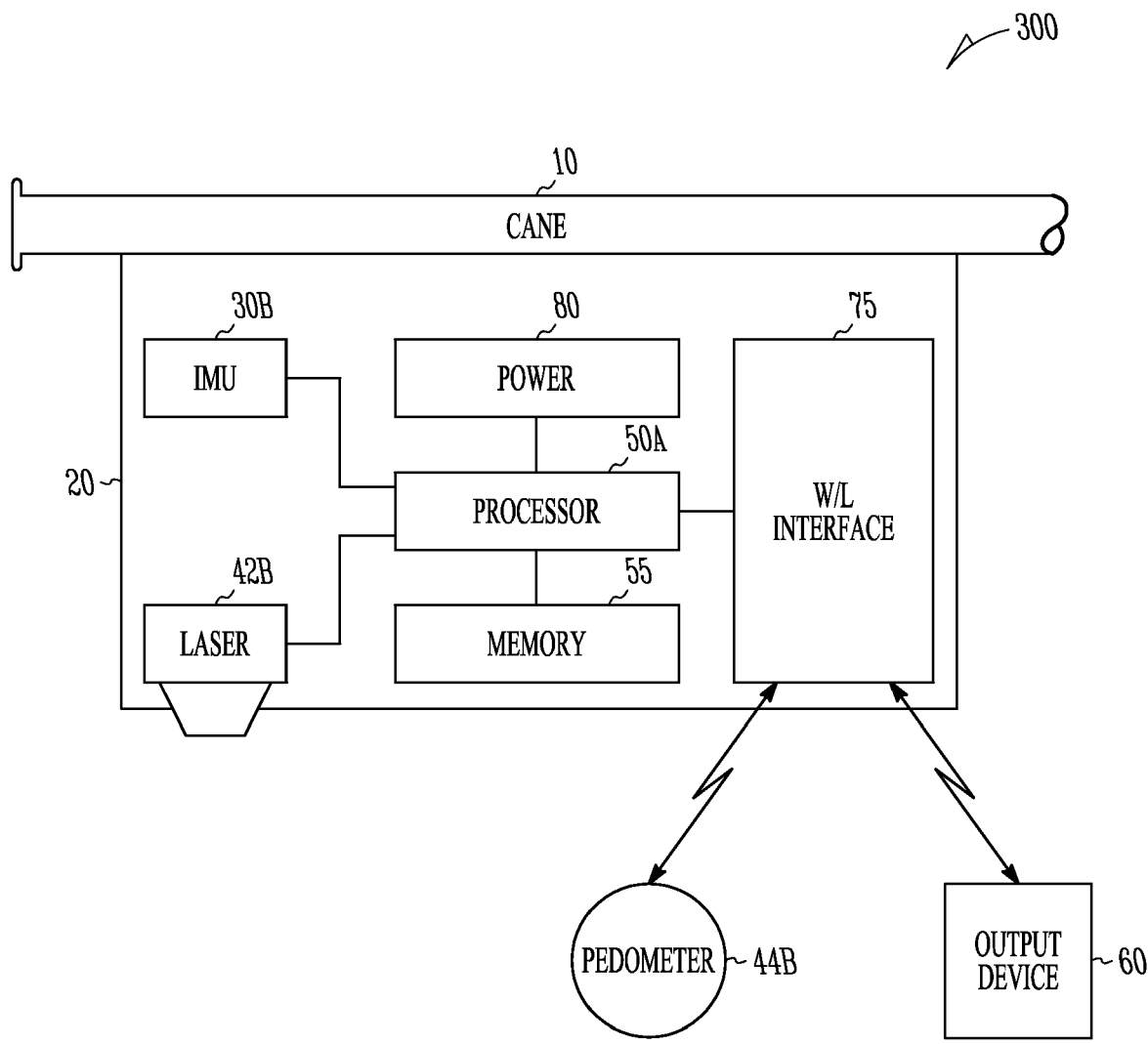
FIG. 3 includes an illustration of a cane mounted indoor navigation system.

FIG. 3 illustrates exemplary system 300. In the example illustrated, sensor 30B and sensor 42B are mounted using housing 20. Housing 20 is shown affixed to white cane 10. Housing 20 also includes power module 80 which, in various examples includes a rechargeable or replaceable battery. Processor 50A is coupled to power module 80 as well as memory 55. Memory 55 can provide storage for instructions used by processor 50A in executing an algorithm as well as data storage corresponding to the navigation data generated by processor 50A. Wireless interface 75 is coupled to processor 50A and in various examples, includes a Bluetooth transceiver or other radio frequency telemetry link. In the example illustrated, output device 60 is coupled by wireless interface 75.

Linear velocity sensor 44B, in the example illustrated, includes a pedometer configured for attachment to the user. In various examples, the pedometer is attached to a leg, hip or foot. Sensors 30B, 42B and 44B are interfaced to processor 50A via USB, RS-232, and Bluetooth, respectively. The real-time software components are written in C++, and the software for simulation and data plotting is written in Matlab. The sensor bay, or housing 20, is mounted beneath white cane 10 which measures 1.27 m when extended and 0.33 m when retracted. In one example, cane 10 is a light-weight carbon fiber cane and the total weight, including sensors, is approximately the same as a standard white cane.

Laser scanner of sensor 42B, in one example, includes an URG-X002S which measures 5 cm by 5 cm by 7 cm. It has an angular scan range of 240 degrees, with an accuracy of ±1% of the measurement for distances 1 m to 4 m. Closer than 1 m, the measurement accuracy is ±10 mm. The laser scanner can measure distances ranging from 0.02 m to 4 m. The scanner weighs 160 g and consumes 2.5 W at 5V.

The 3-axis gyroscope of sensor 30B, in one example, includes an ISIS Inertial Measurement Unit (IMU), with an angular-rate range of ±90 deg/sec. Over an RS-232 connection, the ISIS IMU provides measurements at 100 Hz. The weight of the sensor is 363 g, and the power consumption is 6.72 W at 12V. The IMU measures 5.5 cm by 6.5 cm by 7 cm.

FIG. 3 also illustrates pedometer of sensor 44B which provides linear velocity measurements as the person walks. The size of this sensor is 8.5 cm by 3.5 cm by 3.5 cm. Communication packets are received via Bluetooth at a rate of 1 Hz.

Method

An exemplary method includes generating an attitude estimate of the white cane, determining the heading direction and determining a position of the person. The attitude of the white cane is estimated using a 3-axis gyroscope, and laser-scan measurements of structural planes in the building. The heading direction of the person is extracted from the yaw component of the white cane's attitude estimate with the use of a low-pass filter. This provides a heading measurement to the position filter. The position of the person is estimated using the heading estimates from the low-pass filter, the linear velocity measurements from the pedometer, and the relative coordinates of known corner features detected by the laser scanner.

A. Attitude Estimation of the White Cane

Estimating the attitude of an object in 3-D entails parametrization of the elements involved. One method for specifying an orientation in 3-D is by means of roll, pitch, and yaw (rpy) angles. While the rpy representation is intuitive and readily visualized, it suffers from singularities which can cause instability in an estimator. A more robust attitude representation is the quaternion of rotation $$q = \begin{bmatrix} \hat{k}\sin\frac{\theta}{2} & \cos\frac{\theta}{2} \end{bmatrix}^T \qquad (1)$$

where $\hat{k}$ is the axis of rotation, and $\theta$ signifies the magnitude of rotation. The quaternion representation of an attitude is compact and singularity-free. For clarity, the quaternion notation employed in this paper results in "natural order" quaternion multiplication. As such, the symbol $\otimes$ denotes quaternion multiplication fulfilling $_{L_3}^{L_1}q = _{L_2}^{L_1}q \otimes _{L_3}^{L_2}q$, which is the attitude rotation between successive frames.

Attitude estimation is accomplished through the use of an EKF which fuses measurements from proprioceptive and exteroceptive sensing devices. Rotational velocity measurements from a 3-axis gyroscope are integrated to propagate the attitude estimate, and lines extracted from the laser-scan data are used to update the computed estimate.

1) Attitude Propagation

Propagation of the attitude estimate is performed through the incorporation of proprioceptive information and knowledge about the state propagation model of the system. The gyroscope measures the rotational velocities about each of the local coordinate axes; these velocities are integrated at each time step to generate a new attitude estimate (cf. (4)). 4)). The state vector $X_k$ includes the quaternion q and the gyroscope bias $\hat{b}$. The error state $\tilde{X}_k$ includes the attitude angle-error vector $\delta\theta$ and the gyroscope bias error state $\Delta b = b - \hat{b}$.

The state vector $X_k$ is 7×1 and the error state $\tilde{X}_k$ is 6×1. Some EKF formulations maintain equal sized state and error state vectors. The quaternion of rotation, however, is defined to have unit length which causes the corresponding covariance matrix to lose rank. To account for this, only the attitude angle-error vector $\delta\theta$ (cf. (2)) is used in the error state.

Some EKF applications employ an additive error model. It is convenient though, when using quaternions, to quantify the error as a multiplicative error term $$\delta q = q \otimes \hat{q}^{-1} \cong \begin{bmatrix} \frac{1}{2}\delta\theta \\ 1 \end{bmatrix} \qquad (2)$$

The error quaternion $\delta q$ denotes a small rotational error between the true, q, and the estimated, $\hat{q}$, attitude of the cane.

The state model for the quaternion representation of attitude is governed by the quaternion time derivative (3), which is computed in terms of the instantaneous rotational velocity $\omega$.

$$\dot{q}(t) = \frac{1}{2}\Omega(\omega)q(t) \qquad (3)$$

$$\Omega(\omega) = \begin{bmatrix} -\lfloor\omega\times\rfloor & \omega \\ -\omega & 0 \end{bmatrix}$$

where $\lfloor\omega\times\rfloor$ denotes the skew symmetric cross-product matrix $$\lfloor\omega\times\rfloor = \begin{bmatrix} 0 & -\omega_3 & \omega_2 \\ \omega_3 & 0 & -\omega_1 \\ -\omega_2 & \omega_1 & 0 \end{bmatrix}$$

Propagating the quaternion from time step k to k+1 entails quaternion integration $$q_{k+1} = \begin{bmatrix} \frac{\omega}{|\omega|}\sin\left(\frac{|\omega|}{2}\Delta t\right) \\ \cos\left(\frac{|\omega|}{2}\Delta t\right) \end{bmatrix} \otimes q_k \qquad (4)$$

$$|\omega| = \sqrt{\omega^T\omega}$$

The gyroscope noise model dictates that angular velocity measurements are corrupted by sensor bias b, as well as measurement noise $n_r$. The gyroscope measurement is:

$$\omega_m = \omega + b + n_r \qquad (5)$$

where the turn rate noise $n_r$ is distributed as zero-mean white Gaussian with covariance $\sigma_r^2 I_{3\times 3}$. The sensor bias b is modeled as a random walk with $$\dot{b} = n_\omega \qquad (6)$$

where $n_\omega$ is also distributed as zero-mean white Gaussian noise with covariance $\sigma_\omega^2 I_{3\times 3}$.

The error state equation is computed by taking the derivative of the error state:

$$\dot{\tilde{X}} = F_c \cdot \tilde{X} + G_c \cdot n \qquad (7)$$

$$\begin{bmatrix} \delta\dot{\theta} \\ \Delta\dot{b} \end{bmatrix} = \begin{bmatrix} -\lfloor\hat{\omega}\times\rfloor & -I_{3\times 3} \\ 0_{3\times 3} & 0_{3\times 3} \end{bmatrix} \cdot \begin{bmatrix} \delta\theta \\ \Delta b \end{bmatrix} + \begin{bmatrix} -I_{3\times 3} & 0_{3\times 3} \\ 0_{3\times 3} & I_{3\times 3} \end{bmatrix} \cdot \begin{bmatrix} n_r \\ n_\omega \end{bmatrix}$$

where the matrix $F_c$ is the continuous-time system matrix, and $G_c$ is the corresponding noise matrix. The matrices $0_{m\times n}$ and $I_{m\times n}$ are the m×n zero, and identity matrices, respectively.

While knowledge of the continuous-time system and noise matrices is useful for attaining theoretical results, implementation on a digital computer requires the corresponding discrete-time matrices. For this reason, the above equations are discretized to obtain the discrete-time Kalman filter equations. The discrete-time state transition matrix is defined in terms of its continuous-time counterpart as:

$$\Phi(t_{k+1}, t_k) = e^{\int_{t_k}^{t_{k+1}} F_c(\tau)d\tau} \qquad (8)$$

Attaining the discrete-time noise matrix $Q_d$, is accomplished by integrating the equivalent continuous-time stochastic model over one time step.

$$Q_d = \int_k^{k+1} \Phi(t_{k+1}, \tau) G_c(\tau) Q_c G_c^T(\tau) \Phi^T(t_{k+1}, \tau) d\tau \qquad (9)$$

$$\text{where } Q_c = \begin{bmatrix} \sigma_r^2 I_{3\times 3} & 0_{3\times 3} \\ 0_{3\times 3} & \sigma_\omega^2 I_{3\times 3} \end{bmatrix}$$

With the required matrices now defined, the propagated state is computed in the following manner; the bias estimate is:

$$\hat{b}_{k+1|k} = \hat{b}_{k|k} \qquad (10)$$

The turn rate measurement is estimated by subtracting the estimated bias from the actual measurement $$\hat{\omega}_{k|k} = \omega_{m_k} - \hat{b}_{k|k} \qquad (11)$$

The quaternion estimate is propagated using the quaternion integrator (4), and the current estimate of the turn rate $\hat{\omega}_{k|k}$.

After computing $\Phi$ (cf. (8)) and $Q_d$ (cf. (9)), the covariance propagation is completed using the general form of the EKF covariance propagation $$P_{k+1|k} = \Phi P_{k|k} \Phi^T + Q_d \qquad (12)$$

2) Attitude Update

Even-indexed laser scan data points from a laser range finder are employed to measure the relative orientation between the sensor frame of reference {S} and the global frame {G}. Specifically, the laser sensing plane intersects the planar surfaces inside a building (e.g., walls, floor, ceiling) along lines which can be reliably detected and extracted from the laser data. The direction of each of the extracted lines is processed as a measurement for updating the attitude estimates.

While inside a building, frame $\{G\}$ can be assigned such that its principal axes $\{e1,e2,e3\}$ are perpendicular to the prominent structural planes of the building (i.e., $e1 \perp Wallx$, $e2 \perp Wally$, and $e3 \perp Floor$, Ceiling). Measurements to these planes are denoted by their corresponding unit-vectors (e.g., an x-measurement is a measured line which is perpendicular to the e1 of the global frame). Let $e_i \in \{e1,e2,e3\}$ be one of the three orthogonal unit vectors which span the frame $\{G\}$, and let $^G l$ denote the (unit vector) direction of the line of intersection between the laser-scan plane and the measured plane with respect to $\{G\}$. Then from the geometric constraint, their inner product should be zero.

$$e_i^T {}^G l = 0, i=1,2,3 \quad (13)$$

The measurement equation is derived by rewriting the constraint (cf. (13)) using the transformation relation $^G l = {}_S^G C(q) {}^S l = C^T(q) {}^S l$, i.e.:

$$z = e_i^T C^T(q) {}^S l = 0 \quad (14)$$

$$\hat{z} = e_i^T C^T(\hat{q}) {}^S l_m \quad (15)$$

the rotation matrix $C^T(q)$ denotes the rotation from frame $\{S\}$ to frame $\{G\}$ Note that since $^S l$ is the unit vector direction of a line on the x-y plane of the laser sensor frame, it can be written as $^S l = [\sin \phi - \cos \phi\ 0]^T$ where $\phi$ is the complimentary angle to the line direction. In order to derive the measurement matrix, the true line direction is replaced by its equivalent representation $^S l = {}^S l_m + {}^S \tilde{l}$. Here, $^S l_m$ denotes the measured line direction and $^S \tilde{l} = \lfloor e3 \times \rfloor {}^S l_m \tilde{\phi}$ is the error in this measurement; the true rotation matrix is approximated as $$C^T(q) = C^T(\delta q \otimes \hat{q}) \simeq C^T(\hat{q}) + C^T(\hat{q}) \lfloor \delta \theta \times \rfloor$$

Using (14) and (15), the measurement error $\tilde{z} = z - \hat{z}$ is:

$$\tilde{z} \simeq -e_i^T C^T(\hat{q}) \lfloor {}^S l_m \times \rfloor \delta \theta + e_i^T C^T(\hat{q}) {}^S \tilde{l} \quad (16)$$

$$= [-e_i^T C^T(\hat{q}) \lfloor {}^S l_m \times \rfloor 0_{1 \times 3}] \begin{bmatrix} \delta \theta \\ \Delta b \end{bmatrix} + e_i^T C^T(\hat{q}) \lfloor e3 \times \rfloor {}^S l_m \tilde{\phi}$$

$$= h^T \tilde{X} + n$$

The line direction error $\tilde{\phi}$ accounts for measurement noise as well as inaccuracies in line fitting. Various line fitting methods and the corresponding error models can be utilized.

Updating the attitude filter is done by first computing the residual $$r = z - e_i^T C^T(\hat{q}) {}^S l_m = -e_i^T C^T(\hat{q}) {}^S l_m \quad (17)$$

Second, the covariance of the residual (cf. (18)), and the Kalman gain (cf. (19)) are computed:

$$S = h^T P h + R \quad (18)$$

$$k = P h S^{-1} \quad (19)$$

where $R = E\{n^2\} = (e_i^T C^T(\hat{q}) \lfloor e3 \times \rfloor {}^S l_m)^2 \sigma_\phi^2$ and $\sigma_\phi^2 = E\{\tilde{\phi}^2\}$. The error state update is computed as $$\Delta \hat{x}(+) = \begin{bmatrix} \delta \hat{\theta}(+) \\ \Delta \hat{b}(+) \end{bmatrix} = \begin{bmatrix} 2 \cdot \delta \hat{q}(+) \\ \Delta \hat{b}(+) \end{bmatrix} = kr \quad (20)$$

The error quaternion estimate is $$\delta \hat{q} = \frac{1}{\sqrt{1 + \delta \hat{q}(+)^T \delta \hat{q}(+)}} \cdot \begin{bmatrix} \delta \hat{q}(+) \\ 1 \end{bmatrix} \quad (21)$$

The quaternion estimate, and the bias estimate are updated as $$\hat{q}_{k+1|k+1} = \delta \hat{q} \otimes \hat{q}_{k+1|k} \quad (22)$$

$$\hat{b}_{k+1|k+1} = \hat{b}_{k+1|k} + \Delta \hat{b}(+) \quad (23)$$

The last step in the attitude filter update is to update the covariance [22]:

$$P_{k+1|k+1} = (I - kh^T) P_{k+1|k} (I - kh^T)^T + kRk^T \quad (24)$$

3) Attitude Observability

Due to physical limitations of planar laser scanning, it is impossible to resolve all three degrees of rotational freedom from a stationary vantage point. The attitude of the cane, however, is stochastically observable when the cane is in motion. The observability requirements are satisfied when the laser sensor detects all three main directions in space, at different time steps, over a given time interval.

Since observability of the attitude entails observability of the bias, a simplified measurement model is used with only the quaternion as state variable, and measurement matrix $$h_i^T = \lfloor -e_i^T C^T(\hat{q}) \lfloor {}^S l_m x \rfloor \rfloor \quad (25)$$

In order to establish stochastic observability of the attitude, it suffices to show that the observability Gramian $$M = \sum_{\mu=v-N+1}^{v} \sum_i \Phi_{t_\mu, t_v}^T h_{i,t_\mu} R_{i,t_\mu}^{-1} h_{i,t_\mu}^T \Phi_{t_\mu, t_v} \quad (26)$$

is of full rank for all $v \geq N$ [24].

Noting that the state transition matrix equals $\Phi_{t_\mu, t_v} = C({}_{S_v}^{S_\mu} q)$, the observability matrix can be expressed, after pre- and postmultiplication with the proper rotational matrices, as $$M = \sum_{i,\mu} R_{i,t_\mu}^{-1} C^T(\hat{q}_{t_\mu}) h_{i,t_\mu} h_{i,t_\mu}^T C(\hat{q}_{t_\mu}) \quad (27)$$

$$= \sum_{i,\mu} R_{i,t_\mu}^{-1} ({}^G l_{m,t_\mu} \times {}^G e_i)({}^G l_{m,t_\mu} \times {}^G e_i)^T$$

that is, as a weighted sum of outer products of vectors $^G l_{im}$. If, over a period of time, the sensor observes surfaces with normals $e_i$ that span $R^3$, and recalling that $^G l_i^{TG} e_i = 0$ (cf. (13)), then the vectors $^G h_i$ also span the 3D-space, ensuring M to be of full rank.

Figure 4:
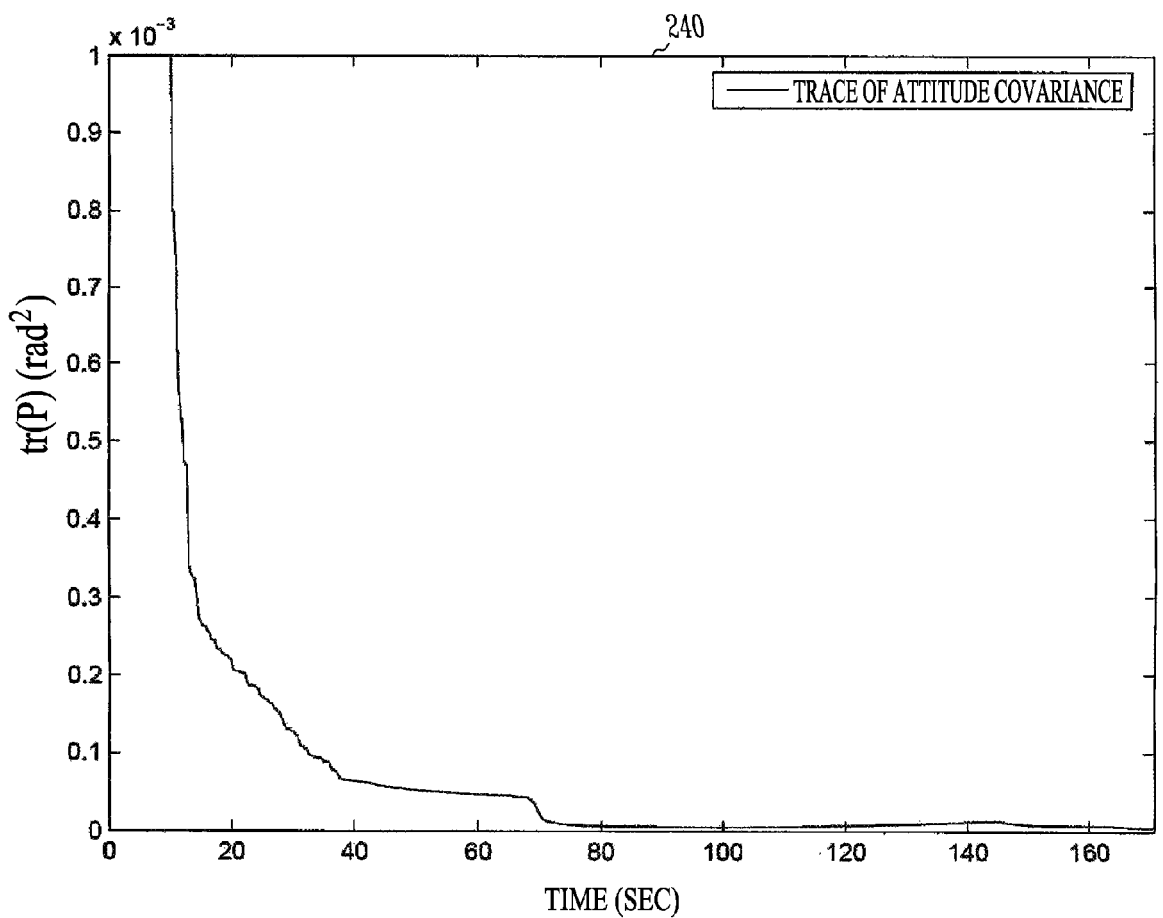
FIG. 4 depicts a trace of attitude covariance of a cane with respect to time.

FIG. 4 depicts graphic 240 showing the trace of the attitude covariance matrix with respect to time. As shown in graphic 240, while the cane is stationary (during bias initialization) its attitude is initially unobservable, however, it becomes observable while the cane is in motion.

Figure 5:
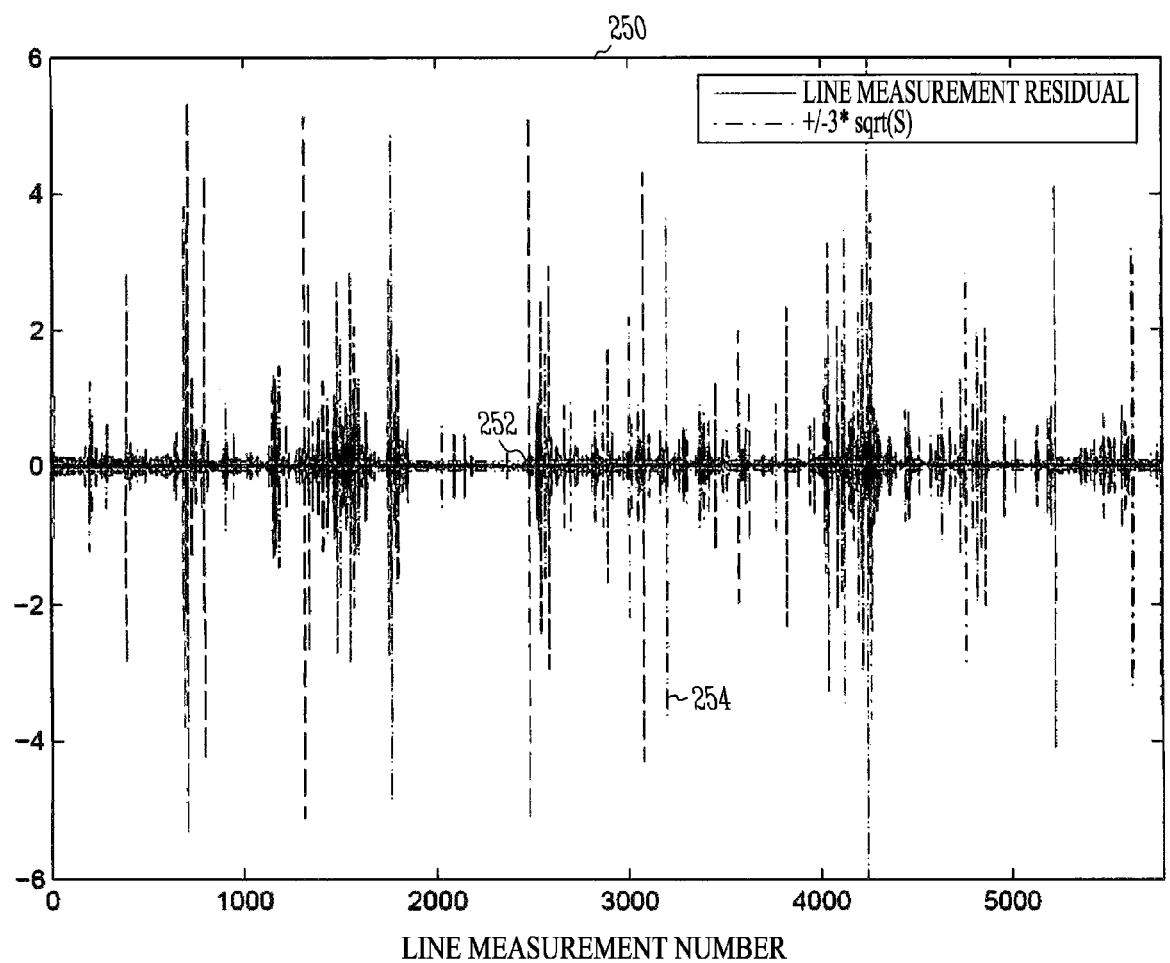
FIG. 5 depicts measurement residuals based on the trace of FIG. 4.

During this experiment, the white cane was initially stationary for 10 sec for the purpose of gyroscope bias initialization. As evident from the experimental results, the trace of the attitude covariance becomes bounded (as expected since the system is observable) once the cane is in motion. In order to ensure consistency of the EKF estimator, the measurement residuals should lie within the $3\sigma$ bounds of the residual covariance. This is verified by the results shown in graphic 250 of FIG. 5. Line measurement residual 252 and 3σ bounds 254 are shown in this plot from the residual covariance. The units of the vertical-axis are omitted considering that this measurement residual is by nature unit-less (it is the difference of unit vector dot-products).

B. Heading Estimation

Figure 6:
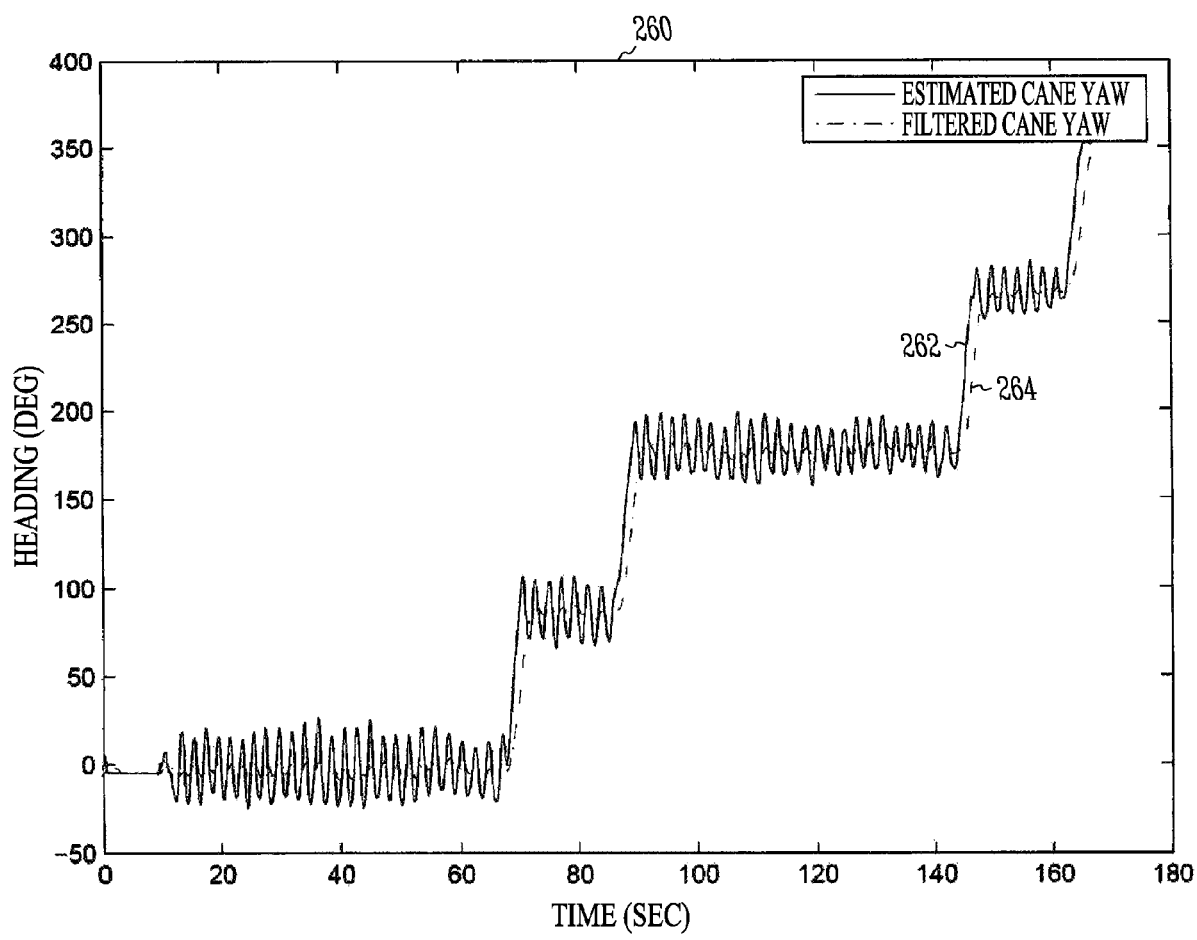
FIG. 6 depicts the yaw component of a cane's attitude estimate before and after low-pass filtering.

By estimating the attitude of the cane, the orientation of the person can be inferred. During regular operation, the yaw angle of the cane will be an asymmetric cyclostationary random process in which the amplitude, phase, frequency and degree of asymmetry may all change (FIG. 6). These characteristics result from swinging the white cane which helps the person identify a clear walking path. Extracting the heading direction of the person from the cane's yaw signal can be accomplished through signal processing. To facilitate real time operation, the following method can be used.

The heading of a person can be approximated as the mean value of the cane yaw over a period of swinging. One solution includes a combination of frequency estimation, and low pass filtering to remove the high frequency component of the yaw. This motivates the use of a Finite Impulse Response (FIR) filter. The attitude EKF provides yaw estimates at 100 Hz. Due to the nature of the motion of the cane, the high frequency component of the yaw does not fall below 0.5 Hz. In order to reduce the number of taps needed by the filter, the yaw signal is downsampled by a factor of 40. The signal is then filtered using a 7th order FIR filter with Kaiser window β=0.5, and a normalized cut-off frequency of 0.02.

FIG. 6 depicts graphic 260 showing the yaw component of the cane's attitude estimate (262) along with the filtered version (264). A byproduct of filtering the yaw signal is that a delay is introduced into the system. Although the filter has only seven coefficient-delay pairs, there is a delay of 1.2 sec because the downsampled yaw signal has a sampling frequency of 2.5 Hz. As a result, an equivalent time-lag exists in the position estimate. However, due to the relatively slow walking rate of a person carrying a white cane, this delay is acceptable for real-time operation.

C. Position Estimation of the Person

An EKF is employed for the purpose of map-based human localization. Estimating the position of a person within a building can be treated as a 2-D position estimation problem in which each floor of the building is a separate environment containing landmarks, in this case corner features, whose position is known. While a person is traversing a single floor, their motion will be constrained on the plane of that floor. This allows for the use of a generic odometry propagation framework.

1) Position Propagation

The non-holonomic formulation of the odometry state equations typically uses the linear and rotational velocity measurements during the propagation stage. These constraints are relaxed for the case of a person. Linear velocity measurements are provided by a foot-mounted wireless pedometer. Note that rotational velocity measurements need not be accessible as the person's heading direction is available from the FIR filter. This odometric model is referred to as direct heading odometry.

$$x_{k+1} = x_k + V\delta t \cos\psi, y_{k+1} = y_k + V\delta t \sin\psi$$

$$\hat{x}_{k+1} = \hat{x}_k + V\delta t \cos\psi_m, \hat{y}_{k+1} = \hat{y}_k + V\delta t \sin\psi_m$$

where x, y, and ψ are the position and orientation of the person, and V is the average velocity during the time interval δt. In the above equations "^" denotes estimates while the subscript m refers to measured quantities, i.e., $$V_m = V + \omega_v, \psi_m = \psi + \omega_\psi$$

where the velocity, $\omega_v$, and heading, $\omega_\psi$, noises are zero-mean white Gaussian processes with variances $\sigma_v^2$ and $\sigma_\psi^2$ respectively. The error model based on these relations is:

$$\begin{bmatrix} \tilde{x}_{k+1} \\ \tilde{y}_{k+1} \end{bmatrix} = \begin{bmatrix} \tilde{x}_k \\ \tilde{y}_k \end{bmatrix} + \begin{bmatrix} -\delta t\cos\psi_m & V_m\delta t\sin\psi_m \\ -\delta t\sin\psi_m & -V_m\delta t\cos\psi_m \end{bmatrix} \begin{bmatrix} \omega_v \\ \omega_\psi \end{bmatrix} \quad (28)$$

$$\tilde{X}_{k+1} = \tilde{X}_k + \Gamma n$$

The covariance propagation is computed as $$P_{k+1|k} = P_{k|k} + \Gamma Q \Gamma^T, \quad \text{where } Q = \begin{bmatrix} \sigma_v^2 & 0 \\ 0 & \sigma_\psi^2 \end{bmatrix} \quad (29)$$

2) Position Update

The person's position estimate is updated by incorporating relative position measurements to known landmarks in the environment. Although the selection of features is arbitrary, using corners at hallway intersections is a good choice for an indoor environment because they occur with a relatively high frequency, and they can be extracted reliably from the laser-scan data. By extracting lines from the odd-indexed laser scan data points, corners are identified with the following characteristics: (i) two lines must be nearly perpendicular, (ii) the endpoints of the lines must be within 5 cm of each other, and (iii) the line orientations must match the possible wall orientations in the environment.

The relative position measurement is written as a 3-D vector from the sensor to the landmark which is aligned to the sensor frame and projected down to 2-D:

$$z = \Pi C(q)(^G p_{L_i} - {}^G p_S), \quad \text{where } \Pi = \begin{bmatrix} 1 & 0 & 0 \\ 0 & 1 & 0 \end{bmatrix} \quad (30)$$

$$\hat{z} = \Pi C(\hat{q})(^G p_{L_i} - {}^G \hat{p}_S) \quad (31)$$

$$\tilde{z} \cong -\Pi C(\hat{q})^G \tilde{p}_S + \Pi \lfloor C(\hat{q})\Delta \hat{p} \times \rfloor \delta\theta + \Pi n_p \quad (32)$$

$$= H\tilde{X} + \Gamma\delta\theta + \Pi n_p$$

The vector $\Delta\hat{p}$ in (32) is the difference between the true position of the ith landmark $^G p_{L_i}$ and the measured location $^G p_{L_{i_m}}$. The measurement noise, denoted $n_p$, is due to noise in the laser scan and linearization errors, and has covariance $R_p$. The position of the sensor S in frame {G} is denoted as $^G p_S$.

The measurement update is performed by computing the measurement residual $$r_{k+1} = z_{k+1} - \hat{z}_{k+1} \quad (33)$$

the covariance of the residual $$S_{k+1} = H_{k+1} P_{k+1|k} H_{k+1}^T + \pi R_p \pi^T \quad (34)$$

and the Kalman gain $$K_{k+1} = P_{k+1|k} H_{k+1}^T S_{k+1}^{-1} \quad (35)$$

With the matrices computed, the state estimate is updated using $$\hat{X}_{k+1|k+1} = \hat{X}_{k+1|k} + K_{k+1}(z_{k+1} - \hat{z}_{k+1}) \quad (36)$$

Lastly, the covariance is updated using $$P_{k+1|k+1} = (I_{2\times 2} - K_{k+1} H_{k+1}) P_{k+1|k} (I_{2\times 2} - K_{k+1} H_{k+1})^T + K_{k+1} R K_{k+1}^T \quad (37)$$

Figure 9:
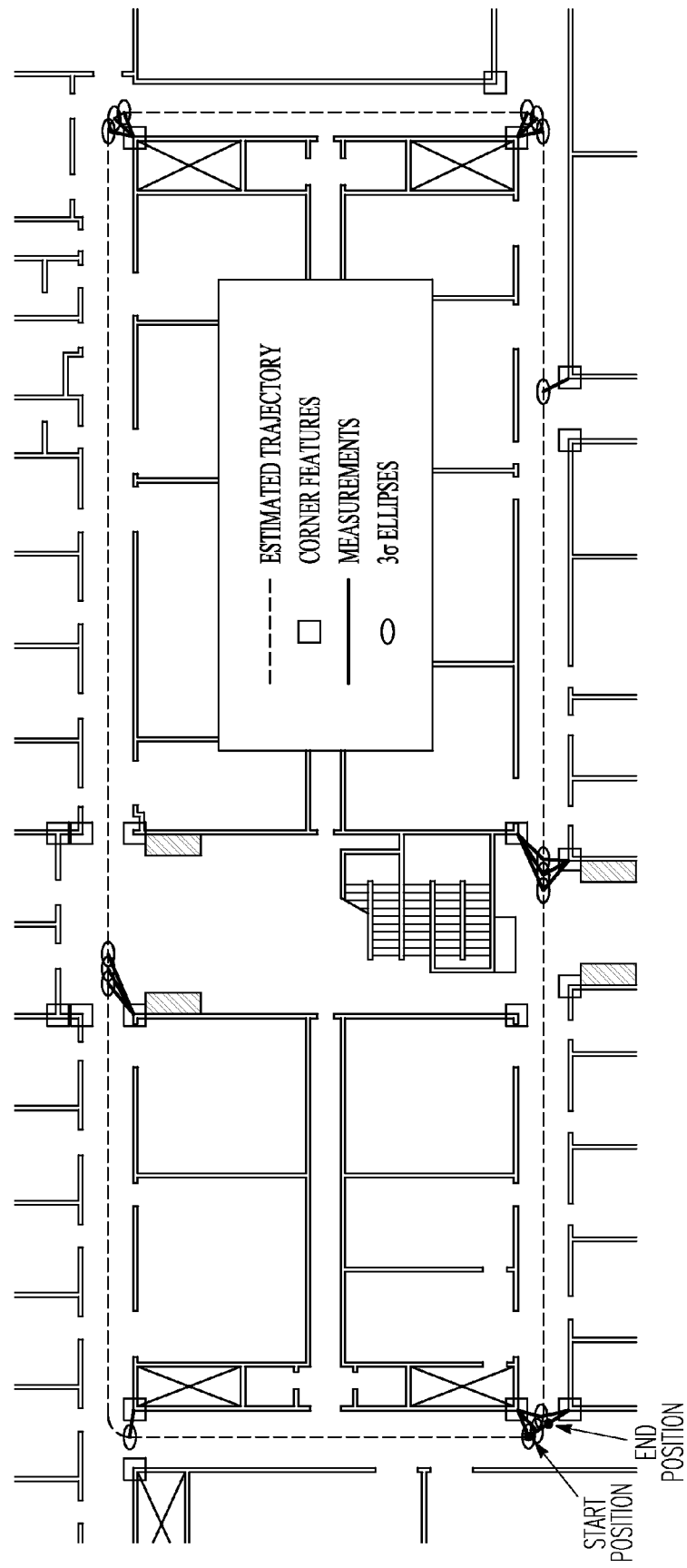
FIG. 9 illustrates an estimated trajectory and a floor diagram.

The system and method described herein can be used in an indoor environment such as the closed loop path shown in FIG. 9. The closed loop has a path length of 130 m. Twenty-one corners along this loop are known a priori from the building blueprints or from another source and are used as features for position updates. While walking around, the user swings the cane to and fro in a natural manner while searching for obstacles which might lie in the path. FIG. 9 shows the estimated trajectory super-imposed on the floor diagram.

FIG. 9 shows data for a 130 m test run, starting in the lower left corner, traveling counter-clockwise and ending back at the start location. The striped regions on the figure depict obstacles (such as furniture or garbage cans) and other objects not represented in the building blueprint.

Additionally, some of the doors along the hallway can be open, while others are closed. The data illustrated represents conditions of normal flow of pedestrian traffic through the hallways. The corners in the map are marked with a box, and measurements are used to update the position estimate as marked with a line to the corresponding corner.

Based on the data illustrated, the uncertainty in the position estimate is low (max $\sigma$=0.16 m), even though the number of position update measurements is small (only 9 corners were detected, approximately 110 total measurements). For the data shown, the attitude estimate of the cane is based on over 5,000 relative orientation measurements. When the orientation error is bounded, i.e., $\sigma_\psi \leq \sigma_\psi^0$, then the position covariance grows as:

$$P(t) \approx \frac{\sigma_v^2 + \sigma_{\psi 0}^2 V^2 \delta T^2}{2} t = \alpha t \quad (38)$$

Figure 7:
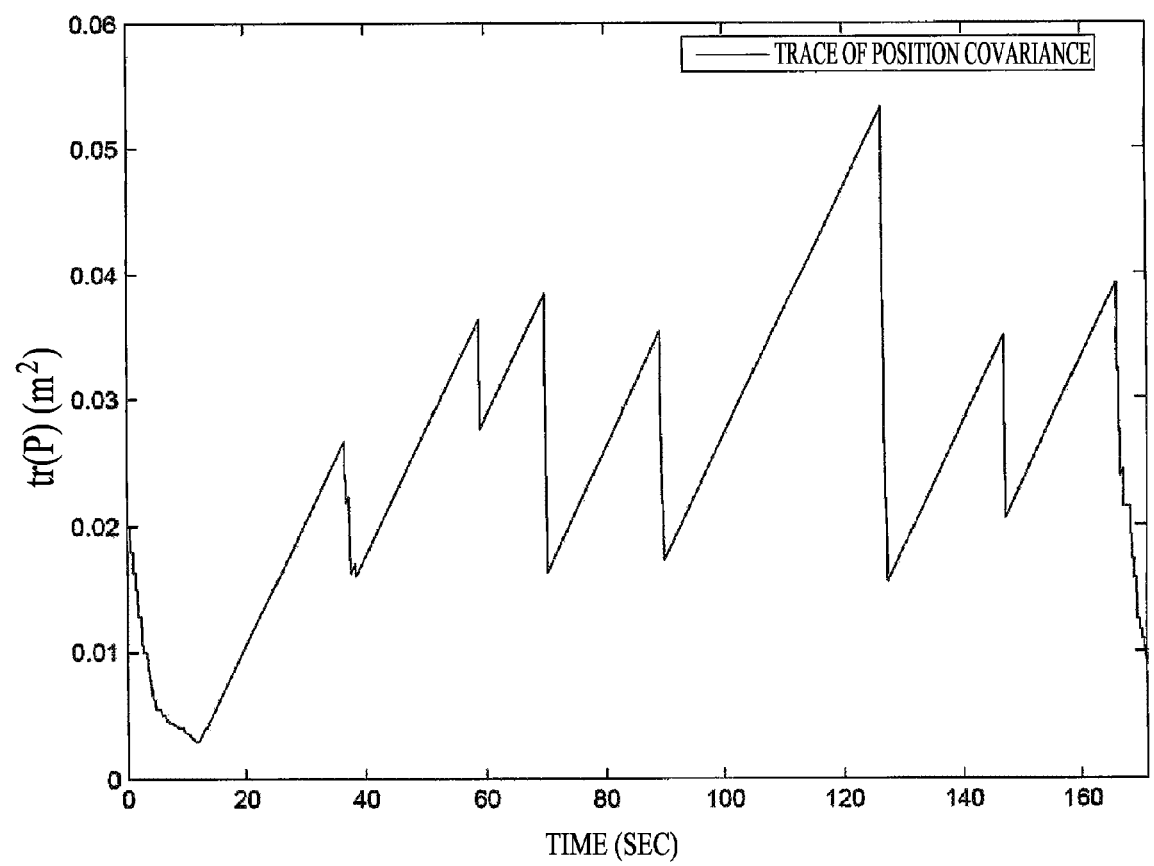
FIG. 7 depicts a trace of position covariance for a cane.

For the data shown, $\delta T$=100 ms and $\alpha$=9.8204×10$^{-4}$. This means that for the case of direct heading odometry, the position uncertainty grows approximately linearly with time between consecutive position updates. Thus, when detecting a small number of corners, the position filter maintains a good estimate. This is corroborated by the time evolution of the trace of the position covariance; the value of the trace remains below 0.054 m2 which corresponds to approximately 0.16 m 1$\sigma$ error in each direction. FIG. 7 illustrates that trace of the position covariance verifies that the positional uncertainty remains bounded, but grows linearly with time between consecutive position updates.

Figure 8A:
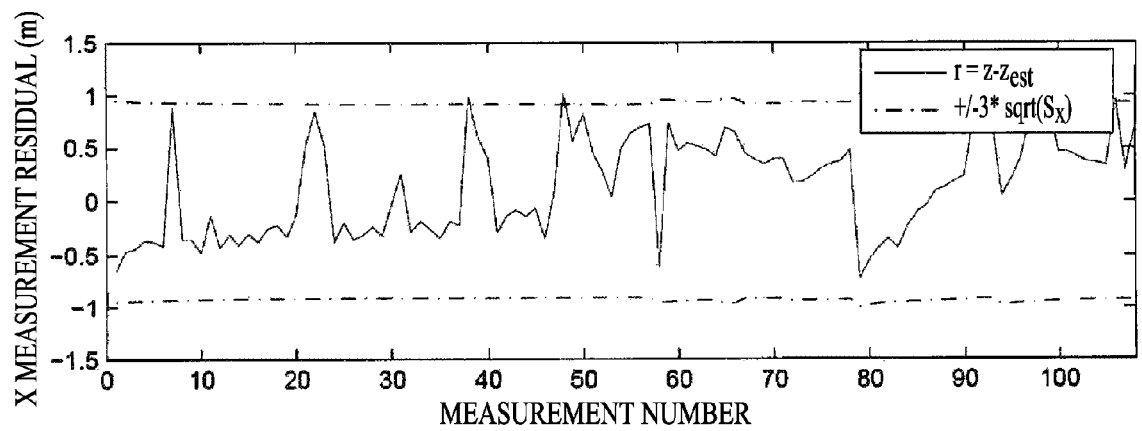
FIGS. 8A and 8B depicts x and y axis position measurement residuals for a cane.
Figure 8B:
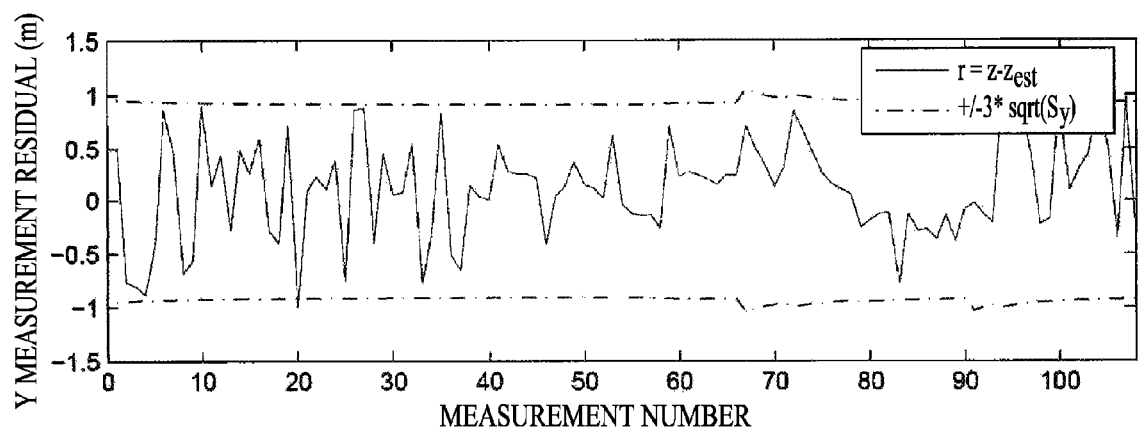

The filter maintains consistency as the x and y components of the measurement residuals fall within the 3$\sigma$ bounds of the residual covariance, as shown in FIGS. 8A and 8B.

The present subject matter includes processing of data from a pair of cane-mounted sensors, and a foot-mounted pedometer involving unknown and time-varying relative coordinate transformation fused using a two-stage pose estimator. The first stage uses inertial measurements from a 3-axis gyroscope and relative orientation measurements from laser scan data to accurately estimate the attitude of the white cane. The second stage generates a pose estimate of the person holding the cane, by incorporating linear velocity measurements from the pedometer, a filtered version of the cane's yaw estimate, and corner features extracted from the laser scan data.

Figure 10:
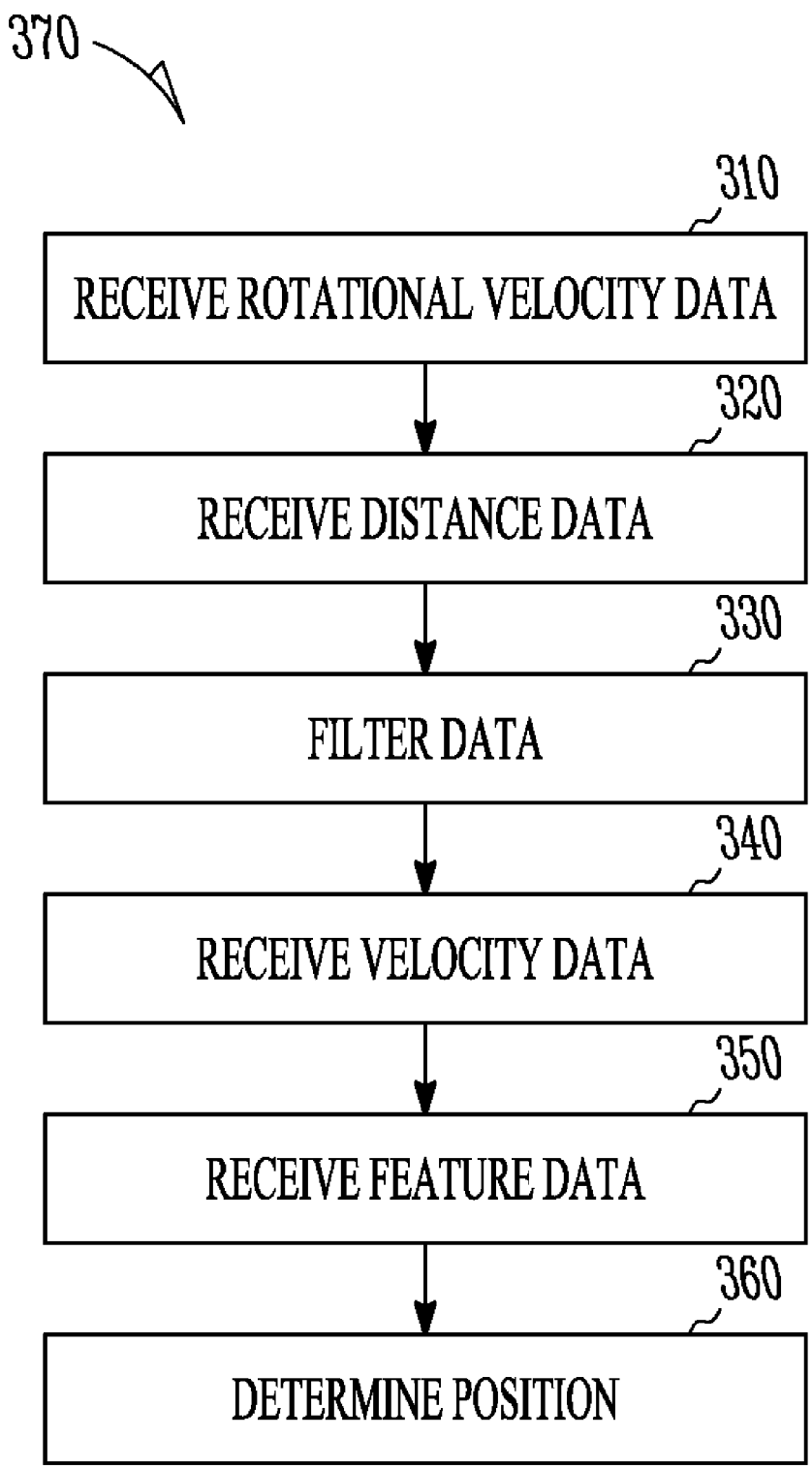
FIG. 10 illustrates a method according to the present subject matter.

FIG. 10 illustrates method 370 according to one example. In method 370, rotational velocity data is received at 310 and distance data is received at 320. A processor executes an algorithm at 330 to filter the data and generate aheading estimate. At 340, velocity data is received and at 350, feature data is received. At 360, the processor generates a position estimate.

ALTERNATIVE EXAMPLES

The present subject matter can be used for path planning by suitable programming of the processor. Path planning can entail generating paths between indoor locations, as well as a haptic feedback system to give the person simple directional commands. A haptic feedback system can include piezoelectric or other vibration inducing transducers.

In one example, the present subject matter can be used to generate a map of an interior space or building where no map is otherwise available.

As used in this document, pose refers to orientation (attitude) and position of a mobile or portable platform with respect to an initial location. The platform can be attached to or carried by a user. In one example, orientation (attitude) is estimated by integrating the rotational velocities (measured by gyroscopes).

In various examples of the present subject matter, attitude corrections are provided intermittently from a) the lines detected by laser scanning measurement (intersection of laser scanning plane with the walls, ceiling and floor); and b) the inclinometers (or equivalently, accelerometers) that measure device tilt angle.

Position can be computed by integrating the distance traveled and/or velocity measurements from the pedometer with the orientation estimate.

Map-based localization affords the ability to intermittently provide corrections to the pose estimator. Such a system uses measurements from laser scanner (and/or camera sensor) and makes reference to any available map.

In one example, the present subject matter allows simultaneous localization and mapping wherein the system both constructs and uses a map of the area.

As used herein, path planning refers to determining and communicating a route to the user.

CONCLUSION

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A portable system comprising:
   a first sensor configured to provide rotational velocity data;
   a second sensor configured to provide distance data based on a reflected signal; and
   a processor coupled to the first sensor and the second sensor and configured to execute an algorithm using the rotation velocity data and the distance data to determine at least one of a position relative to a landmark and a heading relative to the landmark.

2. The system of claim 1 wherein the first sensor includes at least one of a gyroscope, an inertia-based sensor and an accelerometer.

3. The system of claim 1 wherein the second sensor includes at least one of a laser and an ultrasonic transceiver.

4. The system of claim 1 further including a distance measuring device coupled to the processor.

5. The system of claim 4 wherein the distance measuring device includes a pedometer.

6. The system of claim 1 further including an output device coupled to the processor and wherein the output device is configured to render a human perceivable output based on at least one of the position and the heading.

7. The system of claim 6 wherein the output device includes at least one of a haptic transducer, an audio transducer, a memory and a transceiver.

8. A portable system comprising:
   a scanner to provide distance data based on a distance to a surface;
   a gyroscope to provide rotational data based on rotational movement;
   a pedometer to provide travel data based on linear movement;
   a processor in communication with the scanner, the gyroscope, and the pedometer and having instructions for determining navigation data based on the distance data, the rotational data, and the travel data; and
   an output device in communication with the processor and configured to render the navigation data in a human perceivable manner.

9. The system of claim 8 wherein the scanner includes at least one of a laser scanner and an ultrasonic scanner.

10. The system of claim 8 wherein the gyroscope is sensitive to rotation about three axes.

11. The system of claim 8 wherein the pedometer includes an accelerometer.

12. The system of claim 8 wherein the processor includes a personal data assistant.

13. The system of claim 8 wherein at least one of the scanner and the gyroscope is coupled to the processor by a wired connection.

14. The system of claim 8 wherein the pedometer is coupled to the processor by a wireless connection.

15. The system of claim 8 wherein the output device includes at least one of a display, a memory device, an audio transducer, and a haptic device.

16. The system of claim 8 wherein the navigation data includes a map.

17. The system of claim 8 further including:
    a memory coupled to the processor; and
    an input port coupled to the memory and further wherein map data can be received at the input port and stored in the memory.

18. The system of claim 8 further including a housing having disposed thereon at least one of the scanner, the gyroscope, the processor, and the output device.

19. The system of claim 18 wherein the housing is coupled to a cane.

20. A method comprising:
    receiving reflected data corresponding to a surface;
    receiving rotational velocity data corresponding to a rotation;
    receiving linear motion data;
    receiving a landmark location; and
    executing an algorithm using the reflected data, the rotational velocity data, and the linear motion data to determine at least one of a position relative to the landmark location and a heading relative to the landmark location.

21. The method of claim 20 wherein receiving the landmark location includes receiving a map of an interior space.

22. The method of claim 20 further including determining a route within an interior space relative to the landmark location.

23. The method of claim 20 wherein receiving the linear motion data includes at least one of linear velocity data and linear acceleration data.

24. The method of claim 20 wherein executing the algorithm includes implementing a filter.

25. The method of claim 24 wherein implementing the filter includes implementing a Kalman filter.

26. The method of claim 24 wherein implementing the filter includes implementing an extended Kalman filter.

27. A system comprising:
    means for generating rotational velocity data;
    means for generating distance data based on a reflected signal; and
    means for determining, relative to a landmark, at least one of a position and a heading based on the rotational velocity data and the distance data.

28. A system comprising:
    means for providing distance data based on a distance to a surface;
    means for providing rotational data based on a rotation;
    means for providing travel data based on movement;
    means for determining navigation data based on the distance data, the rotational data, and the travel data; and
    output means for rendering the navigation data in a human perceivable manner.

* * * * *

UNITED STATES PATENT AND TRADEMARK OFFICE
CERTIFICATE OF CORRECTION

PATENT NO. : 7,991,576 B2
APPLICATION NO. : 12/381855
DATED : August 2, 2011
INVENTOR(S) : Stergios I. Roumeliotis It is certified that error appears in the above-identified patent and that said Letters Patent is hereby corrected as shown below:

In column 4, lines 43-44, delete "parametrization" and insert -- parameterization --, therefor.

In column 5, line 7, delete "(cf. (4)). 4))." and insert -- (cf. (4)). --, therefor.

In column 5, line 11, after "error" delete "state".

In column 7, line 27, after "{G}" insert -- . --.

In column 7, line 59, before "and" insert -- , --.

In column 8, line 50, delete " $^G 1_{im}.$ " and insert -- $^G h_i = {}^G l_{i_m} \times {}^G e_i$ . --, therefor.

In column 10, line 2, after "$\sigma_\psi^2$" insert -- , --.

In column 10, line 56, delete "$S_{k+1} = H_{k+1} P_{k+1|k} H_{k+1}^T + \pi R_p \pi^T$" and insert -- $S_{k+1} = H_{k+1} P_{k+1|k} H_{k+1}^T + \Pi R_p \Pi^T$ --, therefor.

In column 11, line 67, delete "aheading" and insert -- a heading --, therefor.

In column 12, line 1, delete "340,velocity" and insert -- 340, velocity --, therefor.

Signed and Sealed this
Twenty-ninth Day of November, 2011

David J. Kappos
*Director of the United States Patent and Trademark Office*